March 21, 1944.    A. W. JAROSZ    2,344,878

MICROMETER HEIGHT GAUGE

Filed Jan. 23, 1943

INVENTOR.
ALBERT W. JAROSZ.
BY
Louis Chayka

Patented Mar. 21, 1944

2,344,878

UNITED STATES PATENT OFFICE 2,344,878

MICROMETER HEIGHT GAUGE

Albert W. Jarosz, Detroit, Mich.

Application January 23, 1943, Serial No. 473,412

2 Claims. (Cl. 33—164)

Basically, my invention pertains to that class of gauges which are exemplified by the conventional micrometer and in which a screw with a number of threads to a measuring unit, is used in combination with a cylindrical thimble provided with calibrations on its circumference.

The purpose of my invention is to provide a micrometer height gauge of simple construction and capable of being made at a relatively low cost, and yet including means to adjust said gauge for accuracy whenever needed.

A specific purpose of my invention is to provide a micrometer gauge in which the thimble which is ordinarily secured to the screw forming an essential element of the gauge and turning with it, may be rotatably adjusted with respect to said screw, to compensate for wear of parts or to prevent any inaccuracy in effecting measurements with the aid of my gauge.

Another purpose of my gauge is to provide means of securing to it scribers or other instruments as needed.

This and other features of my construction, will now be described in detail with reference to the accompanying drawing in which.

Similar numerals refer to similar parts throughout the several views.

Figure 1:
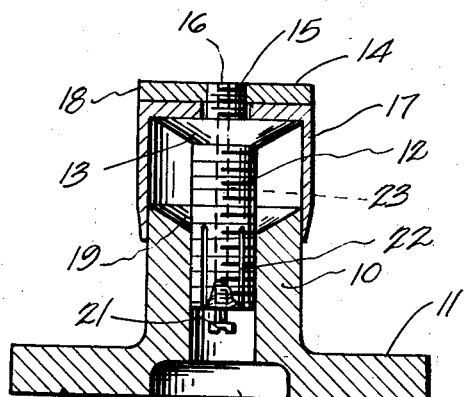
Fig. 1 is a vertical sectional view of my gauge.

The micrometer height gauge of my construction includes a cylindrical barrel 10, resting on a broad, circular base 11. A screw-threaded spindle or micrometer screw 12, provided with a predetermined number of threads to an inch or other measuring unit, is disposed axially within said barrel, which acts as a nut for said screw. At its upper end the screw flares out to form an inverted truncated cone 13, the base of which serves as a support for a thimble 17. Projecting axially from the upper surface, that is the base of cone 13, is a short stem 15 which is threaded on its outer surface. The stem passes through a smooth-bore aperture 14 in the flat top of thimble 17. A plate 18 provided with a threaded aperture, centrally located therein, is screwed upon said stem 15 and above said top of thimble 17.

I wish to point out at this juncture that thimble 17 which skirts barrel 10 and is in a sliding contact with the outer surface thereof, may be freely rotated on its supporting cone 13 until clamped in a fixed position between said cone 13 and plate 18, when the latter is screwed tight into a frictional contact with the upper surface of said thimble.

In order that the micrometer screw 12 may be turned down to its full extent, the top of barrel 10 is countersunk to form a recess 19, corresponding to the outline of cone 13.

Micrometer screw 12 is bored axially right through from one end to the other, and is provided with an internal thread at each end. As it may be desirable to lock the screw in a selected position against any longitudinal movement within barrel 10, this may be effected quite simply by means of a tapered screw 21, fitted axially into the lower end of the micrometer screw 12, as shown in Fig. 1. Said lower end of screw 12 is split by a plurality of radial slots 22. As screw 21 is turned in, it brings about an expansion of the circumference of the lower end of the micrometer screw 12 into an increased frictional contact with the inner surface of barrel 10, and preventing a rotary movement of said screw.

As indicated above, the hole which runs axially through the length of screw 12, and is identified in Fig. 1 by numeral 23, is threaded internally at its upper end, forming a socket 16 in stem 15. This will be found useful in affixing a scriber or some other marking device at the top of my gauge, as it may be easily done by means of a screw like screw 37 fitting into a similar socket at the upper end of hole 38 in the gauge shown in Fig. 3.

Figure 2:
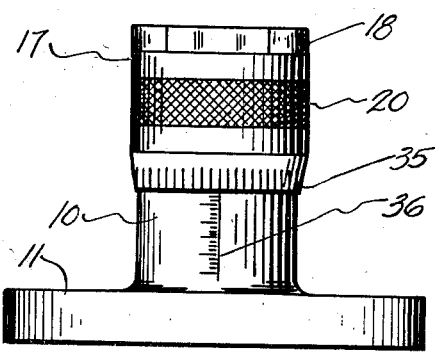
Fig. 2 is a side elevation of my gauge.
Figure 3:
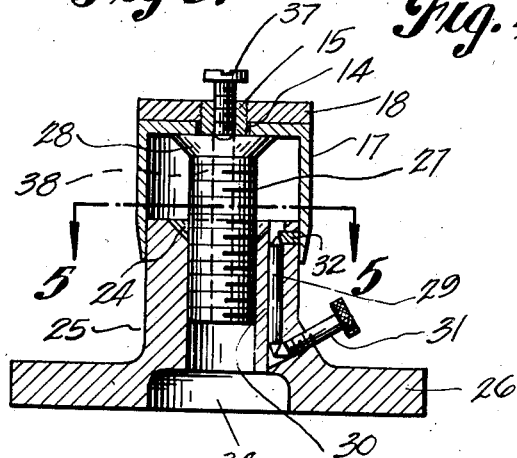
Fig. 3 is a vertical sectional view of my gauge, including novel means of locking the gauge at a definite setting.
Figure 4:
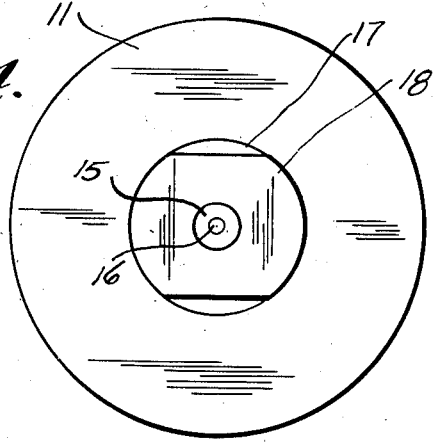
Fig. 4 is a plan view of my gauge shown in Fig. 3.
Figure 5:
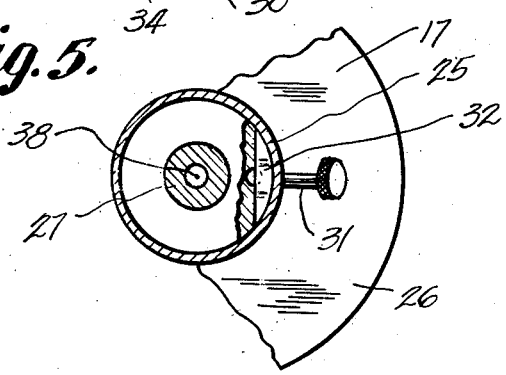
Fig. 5 is a fragmentary sectional view of my gauge, taken on line 5—5 in Fig. 3.

Novel and more convenient means to lock the micrometer screw seated within the barrel are shown in Fig. 3. In this case the thimble and parts above said thimble are identical with those shown in Figs. 1 and 2. Other parts are essentially similar, as they include a base 26, a barrel 25, a micrometer screw 27 with a flared up top 28, fitting into a countersunk recess 24 in the top of barrel 25. However, the means to lock the micrometer screw 27 against rotation, and what follows, against its axial movement, are different. The barrel, as shown in Fig. 3, contains a perpendicular cylindrical hole 30, running parallel to the inner bore of barrel 25. Disposed within the well is a rod 29, having conical ends at the top and at the bottom respectively. The lower end of the rod is in contact with an adjusting screw 31, which is threaded into the side of the barrel so as to project into hole 30. The end of the adjusting screw within the well is tapered to abut the side of the cone on the lower end of rod 29.

At its upper end, said rod 29 bears against a movable wedge 32, located within a horizontal slot, somewhat below the upper surface of barrel 25. When the adjusting screw 31 is turned in, it causes said rod 29 to shift upwardly. As a result thereof, the upper end of the rod, bearing against wedge 32, causes said wedge to move outwardly, that is radially with respect to barrel 25, into a frictional engagement with the inner surface of thimble 17. As the thimble is connected, through intermediate means, with screw 27, said wedge 32 serves as a means of locking said screw against axial movement, as above stated.

In conclusion of my description, I wish to add that base 11 in Fig. 1 contains on its bottom side a recess 33, and that base 26 in Fig. 3 contains a similar recess 34, each recess serving to facilitate access to the micrometer screw within the barrel rising from its respective base. I also wish to point out that both the barrel and the thimble of my gauge have suitable calibrations marked thereon, which may run from zero upwards. Said calibrations are shown in Fig. 1 being indicated by numerals 35 and 36, respectively. When the zero calibration on the thimble coincides with the zero calibration on the barrel, the top surface of my gauge is at a level which is intended to be at a certain definite distance from the bottom surface of said gauge. It is obvious, however, that owing to the wear of the thread of the micrometer screw, or to the wear of the top surface of my gauge or its bottom surface, the actual distance between said surfaces may become smaller to the extent of such wear. When this occurs the gauge may be returned to its initial efficiency and correctness in the following manner: The top plate 18 is loosened, to permit free rotation of thimble 17 while the micrometer screw remains stationary; the thimble thereupon is turned on its supporting cone to the extent necessary to compensate for said wear, and the top plate is again tightened so that the thimble and the micrometer screw turn together. The rotary adjustment of the thimble ought to be such that the initial distance between the top and the bottom surfaces of my gauge will be true and accurate when the zero calibration on the thimble will coincide with the zero calibration on the barrel.

Having thus described my improvement, I wish to claim the following:

1. In a micrometer height gauge, comprising an upright calibrated barrel, a micrometer screw, axially disposed within said barrel, and an externally calibrated thimble, rotating with said screw and skirting the outer surface of the barrel, in combination, a cylindrical hole in the rim of the barrel, running downwardly parallel to its axis, a longitudinal rod within said hole, having cone-shaped ends at the top and at the bottom respectively, an adjusting screw laterally threaded into the wall of the barrel, the end of said screw being in form of a cone and abutting the lower end of said rod, and a wedge in the wall of the barrel, close to its top, in a horizontal slot therein, said wedge being in abutment with the cone-shaped upper end of the rod, and radially movable by said upper end of the rod against the inner surface of the thimble into a frictionally binding contact therewith.

2. In a micrometer gauge of the kind described, and including a barrel and a rotatable thimble skirting it, means to lock the thimble against rotation, comprising, a hole in the rim of the barrel parallel to its axis, a rod in the hole, having both ends cone-shaped, a slot in the wall of the barrel opposite the upper end of the rod, a wedge in the slot bearing against the cone-shaped, upper end of the rod, and screw means abutting the cone-shaped lower end of the rod to push the rod upwardly against the side of the wedge to move it outwardly, out of the slot into a frictionally binding engagement with the inner surface of the thimble.

ALBERT W. JAROSZ.